March 10, 1942.        J. F. CULLIN        2,275,613
BRUSH RIGGING FOR ELECTRIC MACHINES
Filed July 10, 1940
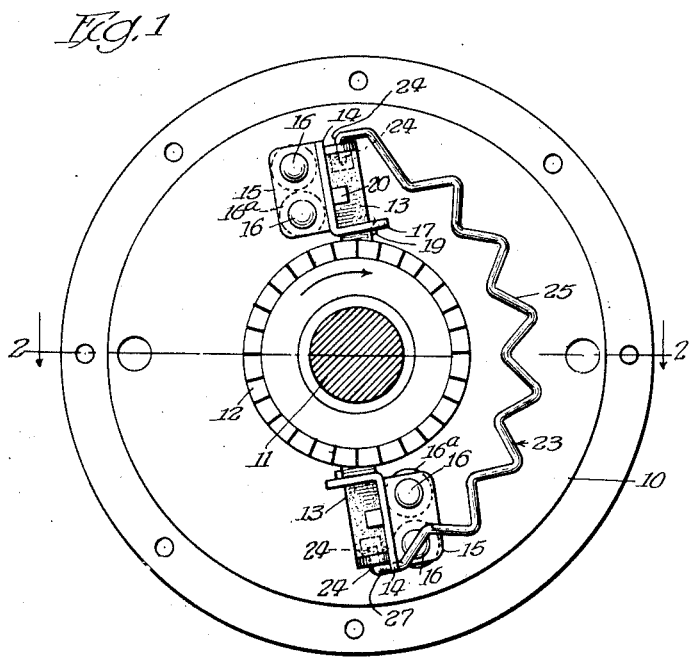
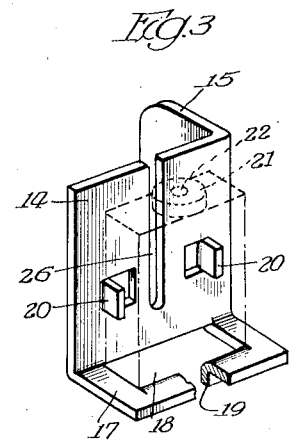
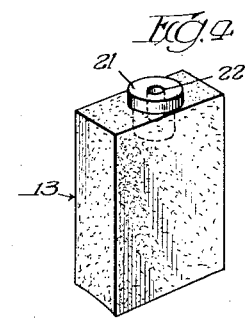
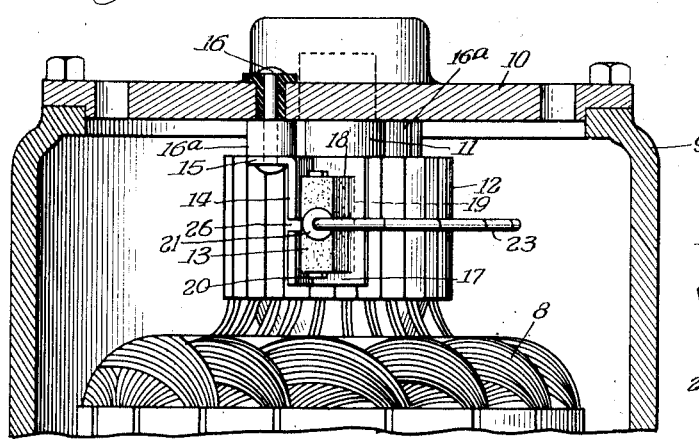
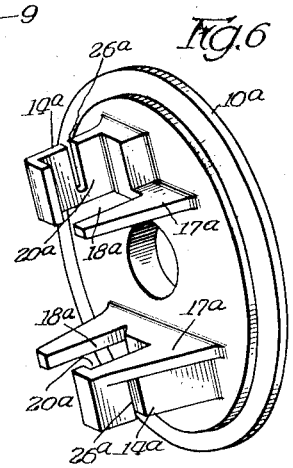
Inventor
Jasper F Cullin
By Red Gerlach
his atty Patented Mar. 10, 1942

2,275,613

UNITED STATES PATENT OFFICE 2,275,613

BRUSH RIGGING FOR ELECTRIC MACHINES

Jasper F. Cullin, Detroit, Mich., assignor of two-thirds to Lou Mervis, Lock Haven, Pa.

Application July 10, 1940, Serial No. 344,676

12 Claims. (Cl. 171—324)

The invention relates to brush rigging for electrical machines.

In generators of the automotive type which are subjected to high speeds and heavy loads, it is desirable to maintain good commutation under the varying conditions under which the generator must operate, and to minimize the vibration of the carbon brushes; to provide guiding means for the brushes which is substantially rigid adjacent the contact points with the commutator to damp out vibrations of the brushes; to maintain equalized pressure on the brushes and of a substantially uniform value throughout the life of the brushes; and to avoid pressure on the brushes which will wear the bearings which carry the armature and commutator.

One object of the invention is to provide a brush rigging in which these desiderata are attained.

Another object of the invention is to provide a brush rigging which is simple and rugged in construction and suitable for mass production.

Other objects of the invention will appear from the detail description.

The invention consists in the several novel features which are hereinafter set forth and are more particularly defined by claims at the conclusion hereof.

In the drawing: Fig. 1 is a side elevation of a brush rigging embodying one form of the invention and mounted on one of the heads of a generator frame. Fig. 2 is a section of a portion of the generator taken on line 2—2 of Fig. 1. Fig. 3 is a perspective of one of the brackets for slidably supporting the brushes formed of plate metal. Fig. 4 is a perspective of one of the carbon brushes. Fig. 5 is a side elevation illustrating a modified form of spring for pressing the brushes into engagement with the commutator. Fig. 6 is a perspective of a modified form of the invention in which the brackets for slidably supporting the brushes are integrally formed with the head on one side of the frame of the generator.

The invention is exemplified in an electric generator which may be of any suitable and well-known type and comprises a frame or casing 9 having a head 10 which forms one side of the frame and a shaft 11 which carries the armature 8 and a commutator 12 formed of segments. The coils of the armature are connected to the segments in any suitable manner, as well understood in the art.

A pair of carbon brushes 13 of rectangular cross-section are slidably supported so their inner ends will contact with the periphery of the segments of the armature at opposite points. Each brush is slidably supported in a bracket (Fig. 3) which is formed of plate metal and comprises a longitudinally extending wall 14 engaged on its front face by the trailing face of a brush; an integral transverse lug 15 which is secured by rivets 16 to the head 10; an inner member 17 integral with the bracket, extending substantially at right angles from the lower end of wall 14, and provided with a rectangular opening 18 in which a brush fits; a downturned lip 19 on member 17 along the outer side of opening 18 which is engaged by the leading face of the brush adjacent its inner end; and lugs or tongues 20 outstruck from the wall 14 for confining the brush against movement longitudinally of the shaft. This exemplifies a bracket for slidably supporting the brush which can be formed of plate metal and formed in dies for mass production and economy in cost. Each lug is spaced from the inner face of head 10 by washers 16$^a$ of insulating material and rivets 16 are also insulated from said head. The brushes and their holders are positioned on the head 10 to permit the brush to slide at an angle to a radial line so that the frictional engagement of the inner end of the brush with the commutator will wedge or press the leading face of the brush against the inner face of lip 19 at the front of opening 18 in the supporting bracket.

Each brush has secured in its outer end a plug or an insert 21 of fiber or other suitable non-conducting material which is provided with a socket 22 in its outer end extending partly through the plug to form an insulated spring-seat. A strip of spring-wire 23 extends around one side of the commutator and is provided with inturned terminals 24 which fit in and are pressed in the sockets 22, respectively, by the resiliency of the wire. The wire is bent sinuously, as at 25, so it will function as a spring between the brushes and press the inner ends of both of the brushes against the commutator. Each wall 14 of the supporting brackets is provided with a slot 26. The wire spring 23 adjacent one terminal 24 extends through the slot 26 in one of the brackets to confine the central portion of the wire spring against longitudinal swaying, or prevent the pivotal movement of the spring in sockets 22.

The important attributes of the construction described are: the spring exerts an equalized pressure against the brushes and produces an equal pressure of the brushes against the periphery of the commutator; the wire spring tends to cause one brush to damp out or break up any periodical vibrations of the other brush to minimize vibrations of the brushes; the spring, being connected to and supported entirely by the brushes and exerting equal pressure against them, avoids any wearing pressure on the bearings for the generator shaft; as the brushes become worn they are subjected to equal pressure even though, in the event of uneven wear which causes one brush to become shorter than the others; and the wire spring always has complete freedom of action on the brushes.

In the modification illustrated in Fig. 5 the wire spring 23a is formed with loops 25a to provide the desirable resiliency at the inturned ends of the spring which interfit with the fiber inserts in the brushes.

In the modified form of the invention illustrated in Fig. 6, the brushes are supported on brackets which are integrally formed with the head of the generator frame or casing. The head 10a is formed of suitable plastic non-conducting material, such as Bakelite or fiber which may be substituted for the usual head 10. Each brush-supporting bracket comprises a longitudinally extending member 14a which is integral with head 10a and is provided with a recess 20a of a width conforming to the width of the brush, and a member 17a integral with and projecting from head 10a and shaped to form a slot 18a through which the inner end of the brush can slide. Member 14a is provided with a slot 29a for holding a portion 27 of the wire spring 23.

The invention exemplifies brush rigging or support for electric generators which produces good commutation under varying conditions, minimizes vibration of the brushes, is simple in construction, avoids wear on the bearings of the generator, and can be produced at a low cost.

The invention is not to be understood as restricted to the details set forth, since they may be modified within the scope of the appended claims, without departing from the spirit and scope of the invention.

Having thus described the invention, what I claim as new and desire to secure by Letters Patent is:

1. In brush rigging for electric machines comprising a commutator and a pair of diametrically opposite brushes engaging the commutator, the combination of fixed guides onto which the brushes are slidable to and from the commutator, inserts of non-conducting material fixedly held in the outer end of the brushes, and spring-means supported in suspension by the brushes for pressing the brushes into contact with the commutator, extending between the diametrically offset brushes and around one side of the commutator, having terminals connected to the inserts respectively and exerting equalized pressure on the brushes.

2. In brush rigging for electric machines comprising a commutator and a pair of diametrically opposite brushes engaging the commutator, the combination of fixed guides onto which the brushes are slidable to and from the commutator, inserts of non-conducting material in the brushes having sockets in their outer ends and a spring supported in suspension by the brushes for pressing the brushes into contact with the commutator, the spring being formed of a strip extending between the diametrically opposite brushes and around one side of the commutator, having terminals radially inward in the sockets of the inserts respectively and exerting equalized pressure on the brushes.

3. In brush rigging for electric machines comprising a commutator and a pair of diametrically opposite brushes engaging the commutator, the combination of guides onto which the brushes are slidable to and from the commutator, inserts of non-conducting material fixed in the brushes and a spring for pressing the brushes into contact with the commutator, formed of a strip extending around one side of the commutator and having its terminals connected to and interfitting with the inserts respectively and supported in suspension by the brushes.

4. In brush rigging for electrical machines comprising a frame, a commutator and a pair of diametrically opposite carbon brushes of polygonal cross-section engaging the commutator, the combination of a pair of brackets on the frame and in which the brushes are slidable to and from the commutator, each bracket comprising a longitudinally extending wall slidably engaged by the trailing face of a brush, a laterally projecting relatively short member at the inner end of the wall having an opening therein, the margin of the opening being engaged by the leading face of the brush adjacent its inner end, and means for guiding the sides of the brush, and spring-means for pressing both brushes into contact with the commutator, extending around one side of the commutator and having terminals connected to and exerting equalized pressure on the brushes.

5. In brush rigging for electrical machines comprising a frame, a commutator and a pair of diametrically opposite carbon brushes of polygonal cross-section engaging the commutator, the combination of a pair of brackets on the frame and in which the brushes are slidable to and from the commutator, inserts of non-conducting material in the ends of the brushes, each bracket comprising a longitudinally extending wall slidably engaged by the trailing face of a brush, a laterally projecting relatively short member at the inner end of the wall, having an opening therein, the margin of the opening being engaged by the leading face of the brush adjacent its inner end, and means for guiding the sides of the brush, and a spring for pressing both brushes into contact with the commutator between and extending around one side of the commutator and having inwardly extending terminals interfitting with the inserts.

6. In brush rigging for electrical machines comprising a frame, a commutator and a pair of diametrically opposite carbon brushes of polygonal cross-section engaging the commutator, the combination of a pair of brackets secured on the frame and in which the brushes are slidable to and from the commutator, each bracket being formed of plate metal and comprising a longitudinally extending wall slidably engaged by the trailing face of a brush, a laterally projecting relatively short member at the inner end of the wall, having an opening therein, the margin of the opening being engaged by the leading face of the brush adjacent its inner end, and members outstruck from the wall for guiding the sides of the brush, and a spring supported in suspension by the brushes for pressing both brushes into contact with the commutator formed of a strip extending around the sides of the commutator and having terminals connected to the brushes.

7. In brush rigging for electrical machines comprising a frame, a commutator and a pair of diametrically opposite carbon brushes of polygonal cross-section engaging the commutator, the combination of a pair of brackets integral with the frame and in which the brushes are slidable to and from the commutator, each bracket comprising a longitudinally extending wall slidably engaged by the trailing faces of the brush, a laterally projecting relatively short member at the inner end of the wall, having an opening therein, the margin of the opening being engaged by the leading face of the brush adjacent its inner end, and means supported in suspension by the brushes for guiding the sides of the brush, and spring-means for pressing both brushes into contact with the commutator extending around the sides of the commutator and having terminals connected to the brushes, respectively, and exerting equalized pressure on the brushes.

8. In brush rigging for electrical machines comprising a frame, a commutator and a pair of diametrically opposite carbon brushes of polygonal cross-section engaging the commutator, the combination of a pair of brackets integral with the frame and in which the brushes are slidable to and from the commutator, each bracket comprising a longitudinally extending wall slidably engaged by the trailing faces of the brush, a laterally projecting relatively narrow member at the inner end of the wall, having an opening therein, the margin of the opening being engaged by the leading face of the brush adjacent its inner end, and means for guiding the sides of the brush, the wall of one of the brackets having a slot therein, and a spring for pressing the brushes against the commutator, formed of a strip having its terminals connected to the brushes, respectively, and extending through the slot.

9. In brush rigging for electric machines comprising a commutator and a pair of brushes engaging the commutator at diametrically opposite points, the combination of fixed guides in which the brushes are slidable against the commutator, and a spring supported in suspension by the brushes, extending circumferentially around one side of the commutator and between the diametrically opposite brushes, and having terminals respectively engaging the outer ends of and applying an equal substantially radial inward pressure against the diametrically opposite brushes.

10. In brush rigging for electric machines comprising a commutator and a pair of brushes engaging the commutator at diametrically opposite points, the combination of fixed guides in which the brushes are slidable against the commutator, and a spring supported in suspension by the brushes, extending circumferentially around one side of the commutator and between the diametrically opposite brushes, and having terminals respectively engaging substantially the center of the outer ends of and applying an equal substantially radial inward pressure against the diametrically opposite brushes.

11. In brush rigging for electric machines comprising a commutator and a pair of brushes engaging the commutator at diametrically opposite points, the combination of fixed guides in which the brushes are slidable against the commutator, and a spring supported in suspension by the brushes, extending circumferentially around one side of the commutator and between the diametrically opposite brushes, and having inwardly extending terminals respectively interfitting with the outer ends of and applying an equal substantially radial inward pressure against the diametrically opposite brushes.

12. In brush rigging for electric machines comprising a commutator and a pair of brushes engaging the commutator at diametrically opposite points, the combination of fixed guides in which the brushes are slidable against the commutator, and a strip of spring wire supported in suspension by the brushes, extending circumferentially around one side of the commutator and between the diametrically opposite brushes, and having terminals respectively engaging the outer ends of and applying an equal substantially radial inward pressure against the diametrically opposite brushes.

JASPER F. CULLIN.